A. WILLIAMS.
VALVE AND COCK.
APPLICATION FILED DEC. 24, 1908.
963,842.
Patented July 12, 1910.
2 SHEETS—SHEET 1.
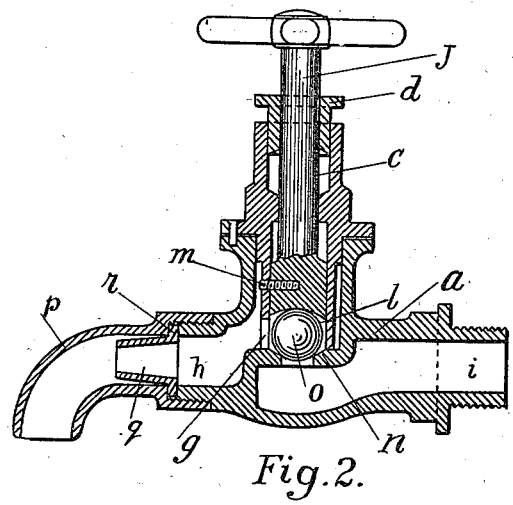
Fig. 2.
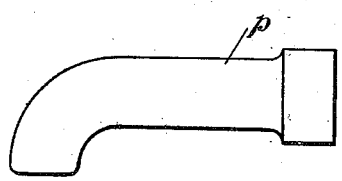
Fig. 5.
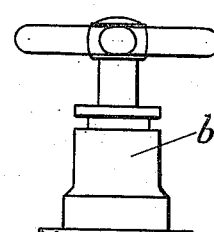
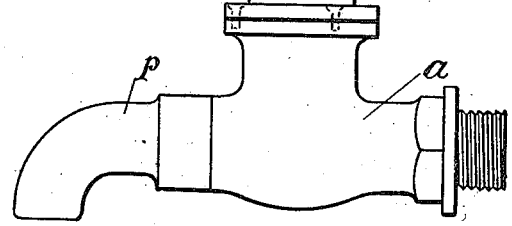
Fig. 6.
Fig. 1.
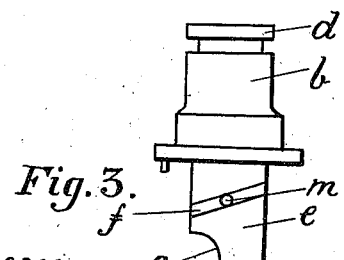
Fig. 3.
Fig. 4.
Fig. 7.
Witnesses.
W. P. Burk
Geo. G. Smith
Inventor
Alfred Williams
per
Attorney

UNITED STATES PATENT OFFICE.

ALFRED WILLIAMS, OF STREATHAM, LONDON, ENGLAND, ASSIGNOR TO CHARLES HENRY HOWE, OF LONDON, ENGLAND.

VALVE AND COCK.

963,842.          Specification of Letters Patent.      Patented July 12, 1910.

Application filed December 24, 1908. Serial No. 469,062.

*To all whom it may concern:*

Be it known that I, ALFRED WILLIAMS, a subject of the King of Great Britain, residing at 86ª Leverson street, Streatham, in the county of London, England, have invented a new and useful Improvement in Valves and Cocks, of which the following is a specification.

This invention which relates to valves and cocks for controlling the flow of liquids and other purposes, has for its objects to reduce the cost of production of such valves and cocks and to insure a steady flow of liquid from the same. I accomplish these objects by the mechanism shown by the accompanying drawings in which:—

Figure 8:
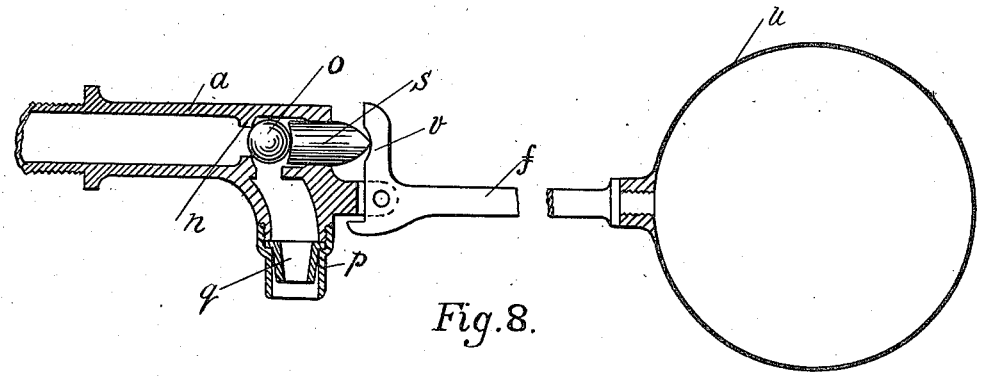
Figure 9:
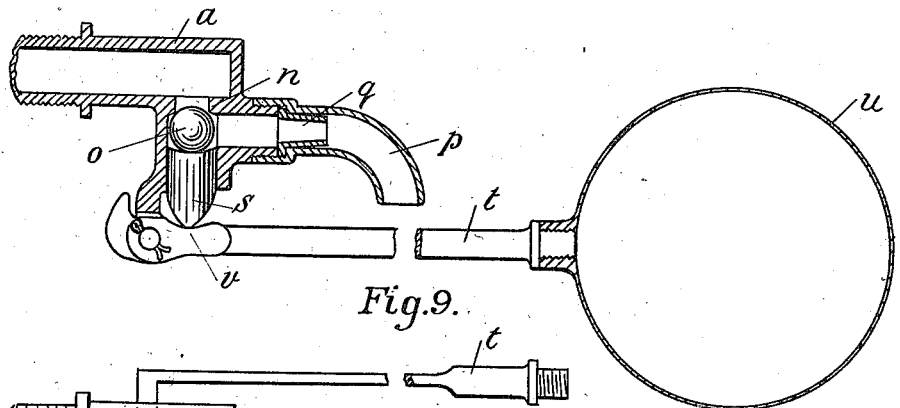
Figure 10:
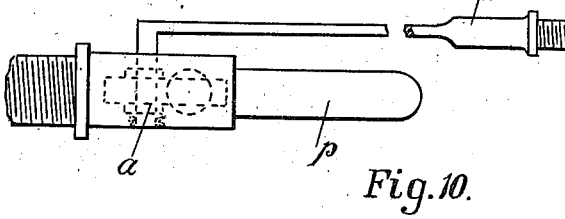

Figure 1 is an elevation of a valve for domestic water supply constructed according to this invention. Fig. 2 is a longitudinal section of the same. Fig. 3 is an elevation of the cap detached from the body of the valve. Fig. 4 shows development of the slot on a plane surface. Fig. 5 is an elevation of one form of detachable bib or nozzle constructed according to this invention. Fig. 6 is an elevation of another form of bib or nozzle also constructed according to this invention. Fig. 7 shows the water regulator. Fig. 8 is a longitudinal section of a float valve constructed according to this invention, with a horizontal plunger. Fig. 9 is a longitudinal section of a float valve constructed according to this invention fitted with a vertical plunger. Fig. 10 is a plan of the same.

Similar letters refer to similar parts throughout the several views.

$a$ is the body of a valve suitable for domestic water supply.

$b$ is the cap which is provided with the usual stuffing box $c$ and gland $d$.

$e$ is a cage made integral with the cap $b$ and is provided with an inclined slot $f$ shown developed by Fig. 4, and with an aperture $g$ facing the outlet $h$.

$i$ is the inlet for the fluid.

In order to avoid the expense and trouble attendant on the screw for opening and closing the valve and the leather washer for making the joint I employ a valve stem $j$ furnished with a knob, cross or other convenient means for rotating the same $k$ at the top and a cup $l$ at the bottom, the stem $j$ being fitted with a screw pin $m$ which engages with the slot $f$ which screw when the stem is rotated causes the stem to move vertically.

$n$ is the valve seating which is made cup-shaped to receive the ball $o$, the seating $n$ and the cup in the bottom of the stem being of greater radius than the radius of the ball $o$ to prevent the ball from sticking in either of the cups.

The horizontal portions of the slot $f$ hold the valve full open or completely closed, intermediate positions being obtained by means of the inclined portions of the slot.

The ball $o$ may be made of metal, vulcanite, vulcanized fiber, soft india rubber, or of any other suitable material; for example steam valves and spirit valves may have metal balls, hot water valves would have rubber or vulcanized fiber balls, and cold water valves would have soft rubber balls. Valves for acids would have the body, cap, ball and stem made of vulcanite as usual, or the body and cap might be made of pottery ware.

In order to reduce the cost of production, instead of having to make a special pattern for a valve or cock with a long bib, another pattern for a valve or cock with a short bib and so on, I make the bibs or nozzles $p$ detachable from the body of the valve or cock so that the valve or cock maker need have a stock of only one pattern of body per unit of size the cocks or valves cast from this pattern being fitted with any size and shape of bib required by the customer.

As will be seen by inspection of Figs. 1, 2 and 5 the bibs are made to screw on to the outlet portion of the body of the cock or valve. Figs. 1 and 2 show the valve or cock fitted with a short bib. Fig. 5 shows a long bib detached from the body of a cock or valve and Fig. 6 shows a detachable bib furnished with a screw thread to receive a hose or other coupling. To regulate the flow of water or other liquid according to the pressure of the liquid entering the valve or cock so as to enable the liquid issue from the mouth of the bib in a solid jet, I place a cone $q$ in the bib, the cone being held between the end of the outlet of the body and the shoulder $r$ of the bib $p$. The taper of the cone depends upon the pressure of the fluid entering the valve or cock, the higher the pressure the smaller the outlet end of the cone and vice-versa. The cap $b$ is secured to the body $a$ by means of screws $w$.

Figs. 8 to 10 show my invention applied to float valves of various kinds, Fig. 8 showing the ball $o$ actuated by a horizontal plunger $s$ and a bell-crank lever $t$ which is attached to the float $u$. The plunger $s$ is made conical or conoidal, the inner end having a cup $u$ formed therein of greater radius than the radius of the ball $o$, the outer end of the plunger engaging with a cup or depression in the lever $t$. Figs. 9 and 10 show a float valve with the plunger vertical.

My invention of detachable bibs and water regulators may be applied to cocks with rotating plugs.

Valves and cocks constructed according to this invention may be made of any suitable material to enable them to be used for steam, water, tar, acids, and other fluids.

I claim:—

1. A cock comprising a body portion having a screw threaded outer end, a detachable nozzle having a screw threaded end adapted to engage with the end of the body portion and a hollow conical piece held between the bib and body portion and having its smaller end projecting into said bib.

2. A cock comprising a body portion having a screw threaded outer end, a detachable nozzle having a screw threaded end adapted to engage with said end of the cock and a conical piece held between the bib and body portion, said conical piece being tapered in the direction of the flow of the water and projecting into the bib.

ALFRED WILLIAMS.

Witnesses:
T. E. HALFORD,
GEORGE NEWBERRY.